(12) United States Patent
Zheng et al.

(10) Patent No.: US 9,762,902 B2
(45) Date of Patent: Sep. 12, 2017

(54) WEIGHTED PREDICTION METHOD AND APPARATUS IN QUANTIZATION MATRIX CODING

(71) Applicants: Futurewei Technologies, Inc., Plano, TX (US); The Regents of the University of California, Oakland, CA (US)

(72) Inventors: Jianhua Zheng, Beijing (CN); Jianwen Chen, Los Angeles, CA (US); Jingsheng Jason Cong, Pacific Palisades, CA (US)

(73) Assignees: Futurewei Technologies, Inc., Plano, TX (US); The Regents of the University of California, Oakland, CA (US)

( * ) Notice: Subject to any disclaimer, the term of this patent is extended or adjusted under 35 U.S.C. 154(b) by 477 days.

(21) Appl. No.: 13/737,863

(22) Filed: Jan. 9, 2013

(65) Prior Publication Data

US 2013/0177075 A1 Jul. 11, 2013

Related U.S. Application Data

(60) Provisional application No. 61/584,548, filed on Jan. 9, 2012.

(51) Int. Cl.
*H04N 7/26* (2006.01)
*H04N 19/126* (2014.01)
(Continued)

(52) U.S. Cl.
CPC ..... *H04N 19/00096* (2013.01); *H04N 19/105* (2014.11); *H04N 19/126* (2014.11); *H04N 19/176* (2014.11); *H04N 19/463* (2014.11)

(58) Field of Classification Search
CPC ........... H04N 19/00096; H04N 19/105; H04N 19/126; H04N 19/176; H04N 19/463
See application file for complete search history.

(56) References Cited

U.S. PATENT DOCUMENTS 6,297,852 B1 * 10/2001 Laksono .................. G09G 5/12
348/500
6,347,297 B1 * 2/2002 Asghar .................. G10L 15/02
704/232

(Continued)

OTHER PUBLICATIONS

Chen, Y., et al., "Quantization Matrices in Fragmented APS," Joint Collaborative Team on Video Coding (JCT-VC) of ITU-T SG16 WP3 and ISO/IEC JTC1/SC29/WG11, 7th Meeting, Geneva, CH, JCTVC-G658, Nov. 21-30, 2011, 3 pages.

(Continued)

*Primary Examiner* — Jay Patel
*Assistant Examiner* — Joseph Suh
(74) *Attorney, Agent, or Firm* — Conley Rose, P.C.

(57) ABSTRACT

A method for decoding and reconstructing a QM associated with a picture, wherein the method comprises acquiring at least one reference QM and at least one weighting factor associated with the reference QM, wherein the reference QM is a previously decoded QM, and computing a predicted matrix using the reference QM and the weighting factor associated with the reference QM, wherein the predicted matrix is used to reconstruct the QM. In another embodiment, a method for encoding a QM associated with a picture, wherein the method comprises acquiring a first QM reference and a second QM reference, acquiring a first weighting factor that corresponds to the first QM reference and a second weighting factor that corresponds to the second QM reference, obtaining the predicted QM using the first QM reference, the second QM reference, the first weighting factor, and the second weighting factor.

13 Claims, 9 Drawing Sheets

(51) Int. Cl.
*H04N 19/105* (2014.01)
*H04N 19/176* (2014.01)
*H04N 19/463* (2014.01)

(56) References Cited

U.S. PATENT DOCUMENTS

| | | | | |
|---|---|---|---|---|
| 6,658,157 | B1* | 12/2003 | Satoh | G06F 17/147 375/E7.143 |
| 7,099,389 | B1* | 8/2006 | Yu | H04N 19/172 375/240.06 |
| 8,149,909 | B1* | 4/2012 | Garbacea | H04N 19/176 348/403.1 |
| 8,934,725 | B1* | 1/2015 | Richter | H04N 19/13 382/162 |
| 2003/0147463 | A1 | 8/2003 | Sato | H04N 7/50 375/240.05 |
| 2004/0005004 | A1* | 1/2004 | Demos | H04N 19/147 375/240.08 |
| 2004/0049379 | A1* | 3/2004 | Thumpudi | G10L 19/008 704/205 |
| 2004/0247048 | A1* | 12/2004 | Dimsdle | H04L 27/361 375/326 |
| 2004/0258156 | A1* | 12/2004 | Chujoh | H04N 19/105 375/240.16 |
| 2005/0053134 | A1* | 3/2005 | Holcomb | H04N 19/70 375/240.12 |
| 2005/0053141 | A1* | 3/2005 | Holcomb | H04N 19/70 375/240.16 |
| 2005/0053300 | A1* | 3/2005 | Mukerjee | H04N 19/105 382/239 |
| 2006/0067406 | A1* | 3/2006 | Kitada | H04N 19/176 375/240.16 |
| 2006/0291562 | A1* | 12/2006 | Lee | H04N 19/105 375/240.16 |
| 2007/0016427 | A1* | 1/2007 | Thumpudi | G10L 19/035 704/500 |
| 2007/0189626 | A1* | 8/2007 | Tanizawa | H04N 19/176 382/251 |
| 2009/0034602 | A1* | 2/2009 | Ancora | H04L 25/0212 375/232 |
| 2011/0142340 | A1* | 6/2011 | Guo | H04N 1/4052 382/167 |
| 2011/0176606 | A1* | 7/2011 | Fuchie | H04N 19/176 375/240.05 |
| 2011/0182524 | A1* | 7/2011 | Shibata | H04N 19/176 382/251 |

OTHER PUBLICATIONS

Zheng, J., et al., "Weighted Predictive Coding for Quantization Matrices," Joint Collaborative Team on Video Coding (JCT-VC) of ITU-T SG16 WP3 and ISO/IEC JTC1/SC29/WG11, 8th Meeting, San Jose, JCTVC-H0522, Jan. 1-7, 2012, 5 pages.

Wang, Y., et al., "Non-CE4: Layered Quantization Matrices Compression," Joint Collaborative Team on Video Coding (JCT-VC) of ITU-T SG16 WP3 and ISO/IEC JTC1/SC29/WG11, 7th Meeting, Geneva, CH, JCTVC-G530, Nov. 21-30, 2011, 6 pages.

Kwon, S., et al., "Overview of H.264/MPEG-4 Part 10," Journal of Visual Communication and Image Representation, Academic Press, vol. 17, No. 2, Apr. 1, 2006, pp. 186-216.

Foreign Communication From A Counterpart Application, PCT Application PCT/US2013/020900, International Search Report dated Apr. 26, 2013, 4 pages.

Foreign Communication From A Counterpart Application, PCT Application PCT/US2013/020900, Written Opinion dated Apr. 26, 2013, 10 pages.

T. Suzuki, et al., "Proposal to Support Quantization Matrix in HEVC," Joint Collaborative Team on Video Coding (JCT-VC) of ITU-T SG16 WP3 and ISO/IEC JTC1/SC29/WG11, 6th Meeting: Torino, Italy, Jul. 14-22, 2011, (Sony Corporation, Texas instruments Inc.), Document: JCTVC-F362, 15 pages.

J. Tanaka, "Enhancement of Quantization Matrix Coding for HEVC," Joint Collaborative Team on Video Coding (JCT-VC) of ITU-T SG16 WP3 and ISO/IEC JTC1/SC29/WG11, 6th Meeting: Torino, Italy, Jul. 14-22, 2011, (Sony Corporation), Document: JCTVC-F475, 11 pages.

K. Sato, et al., "Necessity of Quantization Matrices Compression in HEVC," Joint Collaborative Team on Video Coding (JCT-VC) of ITU-T SG16 WP3 and ISO/IEC JTC1/SC29/WG11, 5th Meeting: Geneva, Switzerland, Mar. 16-23, 2011, (Sony Corporation), Document: JCTVC-E056, 4 pages.

J. Chen et al., "Macroblock-Level Adaptive Frequency Weighting for Perceptual Video Coding," IEEE Transactions on Consumer Electronics, vol. 53, No. 2, May 2007, pp. 775-781.

* cited by examiner

WEIGHTED PREDICTION METHOD AND APPARATUS IN QUANTIZATION MATRIX CODING

CROSS-REFERENCE TO RELATED APPLICATIONS

This application claims the benefit of U.S. Provisional Patent Application No. 61/584,548 filed Jan. 9, 2012 by Jianhua Zheng, et al, and entitled "Weighted Prediction Method and Apparatus in Quantization Matrix Coding," which is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Video and audio compression methods have greatly contributed to the success of multimedia systems, such as the broadcast of digital television (TV) and streaming of Internet based video. Video compression methods reduce the amount of video data needed to store and transmit digital video images. Video compression methods have dramatically improved through the development of well-known International Telecommunication Union Telecommunication Standardization Sector (ITU-T) and International Organization for Standardization (ISO)/International Electrotechnical Commission (IEC) standards. One such standard, developed through the collaboration of ITU-T and ISO/IEC, is the H.264/Moving Picture Experts Group-4 (MPEG-4) Advance Video Coding (AVC). The H.264/MPEG-4 AVC standard has been widely adopted for many of today's video applications, such as high definition (HD) TV signals, real-time streaming videos, mobile applications, and BLU-RAY discs. However, modern communication and network systems are facing severe challenges as the video demand continues to increase with the diversification of video services, the emergence of beyond-HD video format, and the expectations for higher quality and resolution for a plethora of mobile devices.

The most recent video project by the ITU-T and ISO/IEC organizations is the development of the High Efficiency Video Coding (HEVC) standard. HEVC attempts to address infrastructure concerns by enhancing video resolution and implementing additional parallel processing architectures. In contrast to the H.264/MPEG-4 AVC standard, HEVC improves video quality and the data compression ratio while supporting resolutions up to 8,192×4,320. One way HEVC improves the coding efficiency of video content is by utilizing larger quantization matrices (QMs). For instance, HEVC may implement QMs up to a 32×32 block size, while the H.264/MPEG-4 AVC limits the quantization matrix (QM) block sizes to an 8×8 block size. Although larger QMs may enhance coding efficiencies, larger QMs, unfortunately, also produce larger overheads used to carry the QMs within a video bitstream, and thus cause bandwidth and capacity concerns.

In HEVC, a video picture may comprise twenty-four different QMs. The QMs associated with the video picture may have a variety of block sizes that include 4×4, 8×8, 16×16, and 32×32. The QM blocks associated with the video picture may correspond to intra/inter prediction types and luma/chroma (Y/Cb/Cr) color components. When encoding and storing the picture parameter sets (e.g. information such as picture size and optional coding modes) for a video picture, the number of matrix coefficients may equal 7,680 ((16*16+32*32)*2* 3) for the 16×16 and 32×32 QM blocks. Each coefficient may be about 8 bits long, and thus encoding the QM coefficients may produce an overhead of over 60,000 bits (7,680*8). A typical length for a compressed HD video frame may be about 50,000 to 500,000 bits in length. Hence, an overhead of over 60,000 bits to encode QM coefficients is too large to be encoded within a compressed video frame. Additionally, coding larger QMs (e.g. 32×32 QMs) using the AVC quantization matrix compression method found in the H.264/AVC standard (e.g. differential pulse code modulation (DPCM)) also produces an overhead that is substantially larger than a compressed HD video frame. Therefore, a more efficient coding method is needed to encode larger QMs.

SUMMARY

In one embodiment, the disclosure includes an apparatus for decoding a video bitstream to reconstruct a QM associated with a picture, comprising a processor configured to acquire a weighting factor, acquire a reference QM, wherein the reference QM is a previously decoded QM, associate the weighting factor with the reference QM, and compute a predicted matrix using the reference QM and the weighting factor associated with the reference QM, wherein the predicted matrix is used to reconstruct the QM.

In yet another embodiment, the disclosure includes an apparatus for encoding a QM associated with a picture, comprising a reference QMs acquire unit configured to acquire a plurality of reference QMs, wherein the references QM have previously been encoded, a weighting factor computation unit coupled to the reference QMs acquire unit, wherein the weighting factor computation unit is configured to compute a weighting factor for each of the reference QMs, a weighting prediction unit coupled to the reference QMs acquire unit and the weighting factor computation unit, wherein the weighting prediction unit is configured to compute a predicted QM using the reference QMs and the corresponding weighting factors, and a weighting factors storage unit coupled to the weighting factor computation unit, and wherein the weighting factors storage unit is configured to store the weighting factors into a video bitstream.

In yet another embodiment, the disclosure includes a method for decoding and reconstructing a QM associated with a picture, wherein the method comprises acquiring at least one reference QM and at least one weighting factor associated with the reference QM, wherein the reference QM is a previously decoded QM, and computing a predicted matrix using the reference QM and the weighting factor associated with the reference QM, wherein the predicted matrix is used to reconstruct the QM.

In a fourth embodiment, the disclosure includes a method for encoding a QM associated with a picture, wherein the method comprises acquiring a first QM reference and a second QM reference, acquiring a first weighting factor that corresponds to the first QM reference and a second weighting factor that corresponds to the second QM reference, obtaining the predicted QM using the first QM reference, the second QM reference, the first weighting factor, and the second weighting factor, and encoding the first weighting factor and the second weighting factor into a video bitstream.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are a method, an apparatus, and a system that may be used to encode and decode video image data. The video image data may be encoded and decoded using weighted predictive methods for inner QM predictions and/or cross-frame QM predictions. When encoding and compressing video image data, reference QMs (e.g. already encoded QMs) and weighting factors may be used to predict a current QM associated with the current picture. Linear weighting, equally weighting, and/or average weighting methods may be used to obtain weighting factors associated with the reference QMs. For cross-frame QM weighting predictions, the weighting factors may be determined using the time distance between the current picture and the reference pictures. In inner QM predictions, the weighting factors may be determined based on QM parameters, such as component types and block size. The weighting factors and other prediction information may then be encoded and transmitted as a video bitstream. When decoding the video bitstream, prediction information may be obtained from the video bitstream to reconstruct the video image data. Similar to encoding video image data, decoding compressed video image data may use the weighting factor and reference QMs to predict a current QM associated with the current picture. Residue values may be calculated by comparing the current QM with the predicted QM When implementing lossless coding. Otherwise, in lossy coding, the current QM associated with a picture may be quantized prior to entropy coding.

Figure 1:
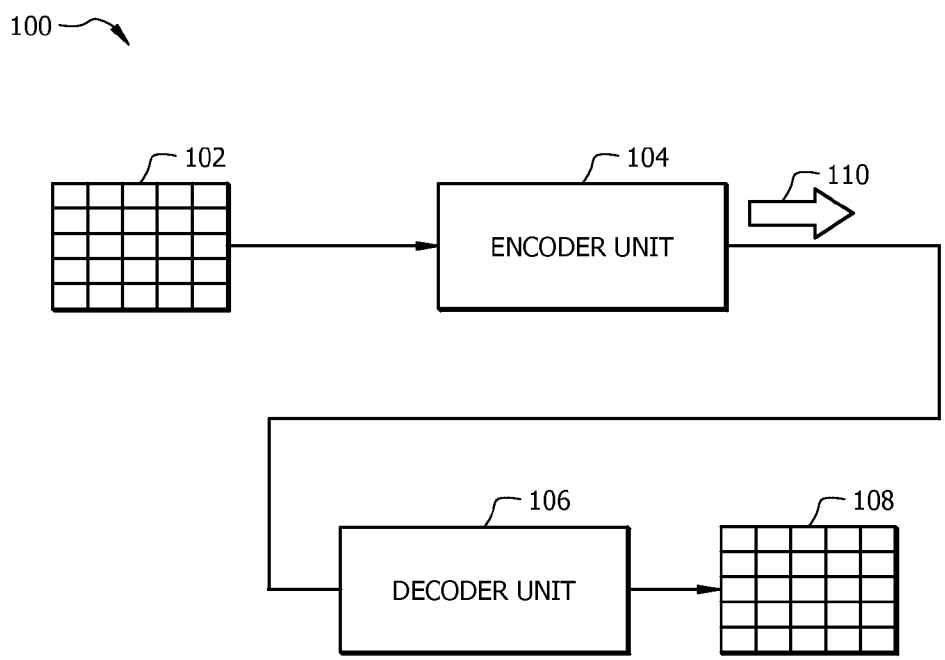
FIG. 1 is a schematic diagram of an embodiment of a system used to encode and decode video image data.

FIG. 1 is a schematic diagram of an embodiment of a system 100 used to encode and decode video image data. System 100 may comprise an encoder unit 104 configured to compress and encode a video data video source image data 102 and a decoder unit 106 configured to reconstruct a video output image data 108. System 100 may implemented in a range of applications that provide video content that include, but are not limited to TV broadcasting, such as airwave broadcasting, cable broadcasting, and/or satellite broadcasting, video streaming over one or more networks, and/or video storage media (e.g. optical discs and digital video tape recorder (VTR)). System 100 may be implemented within a single device or a plurality of interconnected devices. Encoder unit 104 may be coupled to the decoder unit 106 via electrical connections, optical connections, wireless connections, and/or various combinations thereof. Encoder unit 104 and decoder unit 106 may be implemented using software, hardware, or a combination of both. For example, the encoder unit 104 may comprise an integrated circuit (IC) configured to encode and compress video data in compliant with the HEVC, H.264, MPEG-4, and a variety of other video coding standards. The decoder unit 106 may comprises an IC configured to decode and support video content encoded using one of the video coding standards. Both the encoder unit 104 and decoder unit 106 may be loaded with software or executable instructions (e.g. a programmed general purpose processor) to encode and decode video image data.

Encoder unit 104 may receive a video source image data 102 that may comprise a plurality of picture sequenced together to form a video sequence. The video source image data 102 may be a relatively quick succession of the plurality of pictures that creates the perception of motion. Each picture may comprise a plurality of picture elements or pixels, each of which may represent a single reference point in the picture. During digital processing, each pixel may be assigned an integer value (e.g., 0, 1, ..., 255) that represents an image quality and/or color at the corresponding reference point. The color space may be represented by three components including a luminance (luma or Y) component and two chrominance (chroma) components, denoted as Cb and Cr (or sometimes as U and V).

Encoder unit 104 may split each picture into block-shaped regions to encode and compress the video source image data 102 into a bitstream 110. The encoder unit 104 may perform a variety of encoding and compression functions, such as predictive coding, quantization, residual coding, and/or entropy coding. The encoded bitstream 110 may conform to a video coding standard, such as HEVC, H.264, and MPEG-4. The bitstream 110 may comprise weighting factors, residues, video resolution, frame rate, block partitioning information. (sizes, coordinates), prediction modes, and other video information used to decode the video source image data 102. Encoder unit 104 may subsequently transmit bitstream 110 to the decoder unit 106.

Once the decoder unit 106 receives bitstream 110, decoder unit 106 may use the bitstream 110 to reconstruct the video output image data 108. The decoder unit 106 may use a decoder picture buffer to obtain reference frames, and then use the reference frames to predict subsequent pictures frames within the video output image data 108. The order in which the encoder unit 104 and the decoder unit 106 processes the plurality of pictures may differ from the sequence order of the pictures within the video source image data 102 and video output image data 108. Reference frames may be pictures within the video source image data 102 and video output image data 108 already processed by the encoder unit 104 and/or the decoder unit 106. The encoder unit 104, decoder unit 106, and the encoding/decoding process will be discussed more in detail below.

Figure 2:
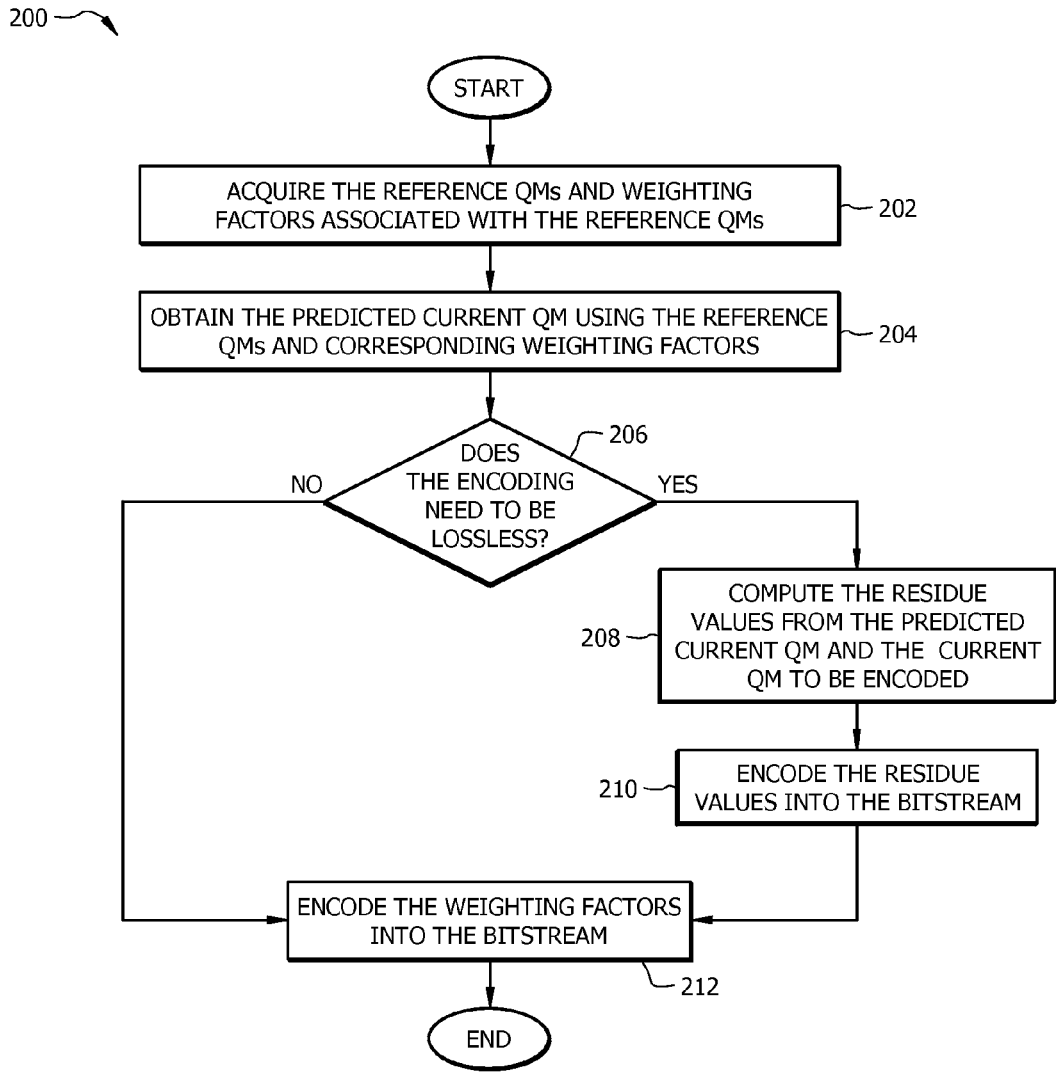
FIG. 2 is a flowchart of an embodiment of a method 200 that encodes prediction information into a bitstream.

FIG. 2 is a flowchart of an embodiment of a method 200 that encodes prediction information into a video bitstream. Method 200 may be used to support lossless coding (e.g. able to reconstruct the original data from the compressed data) and lossy coding (e.g. constructing an approximation of the original data). In lossless coding, the residue values obtained from comparing the predicted QM with the current QM (e.g. the actual QM associated with the current picture) may be encoded into the video bitstream along with the weighting factors. However, in lossy coding, the current QM may be quantized and encode the weighting factors without the residue values into the video bitstream. Method 200 may also pertain to both cross-frame and inner QM predictions. A cross-frame QM prediction predicts QMs associated with the current frame based on reference QMs from reference frames. Inner QM prediction predicts QMs associated with the current picture using the reference QMs associated with the current picture. For example, in inner QM predictions, two of the twenty-four QMs associated with the current picture may be selected to predict a current QM associated with the current picture. The current picture may represent the picture currently being encoded by method 200. Cross-frame and inner QM predictions will be discussed in more detail later in the disclosure.

Method 200 starts at block 202 and acquires the reference QMs and weighting factors associated with the reference QMs. In a cross-frame QM prediction, reference QMs may be already known to the current QM (e.g. encoded QMs associated with reference frames of the current picture). In inner QM predictions, the reference QMs may also be already known to the current QM (e.g. QMs associated with reference frames of the current picture). The weighting factors may be calculated based on a linear weighting, equally weighting, and/or average weighting. Linear weighting, equally weighting, and/or average weighting may be used for cross-frame QM predictions and inner QM predictions. Linear weighting, equally weighting, and average weighting will be discussed in more detail in FIGS. 4-8.

Afterwards, method 200 proceeds to block 204 and obtains the predicted QM using the reference QMs and corresponding weighting factors for the reference QMs. The number of reference QMs used to obtain the predicted QM may be obtained from a predefined value. For example, in FIG. 1 encoder unit 104 may be hardcoded (e.g. predefined) to use two reference QMs to produce the predicted QM. Another embodiment of block 204 may set the number of reference QMs to equal the number of weighting factors. Calculating and acquiring the weighting factors to generate the predicted QM will be discussed in more detail later.

Once method 200 obtains the predicted QM for the current picture, method 200 may then move to block 206. At block 206, method 200 determines whether the current QM associated with the current picture may be encoded using lossless or lossy coding. If method 200 uses lossless coding to encode the current QM, method 200 then proceeds to block 208. At block 208, method 200 may compute the residue values based on the predicted QM and the current QM to be encoded. The residue values may represent the error or difference between the QM coefficients of the predicted QM and the current QM. Method 200 then moves to block 210 to encode the residue value into the video bitstream. Method 200 may use entropy coding techniques well-known in art, such as Huffman coding or Arithmetic coding to compress and encode the residue value into the video bitstream. Subsequently, method 200 may move to block 212.

Returning to block 206, method 200 may move to block 212 when method 200 uses lossy coding to encode the current QM. Method 200 may encode the calculated weighting factors acquired in block 202 using the entropy coding techniques as described in block 210. Method 200 may also encode the number of reference QMs into the video bitstream at block 212 when the number of reference QMs is not Obtained from a predefined value. In one embodiment of block 212, the predicted QM may be encoded into the video bitstream. Method 200 ends after completing block 212.

Figure 3:
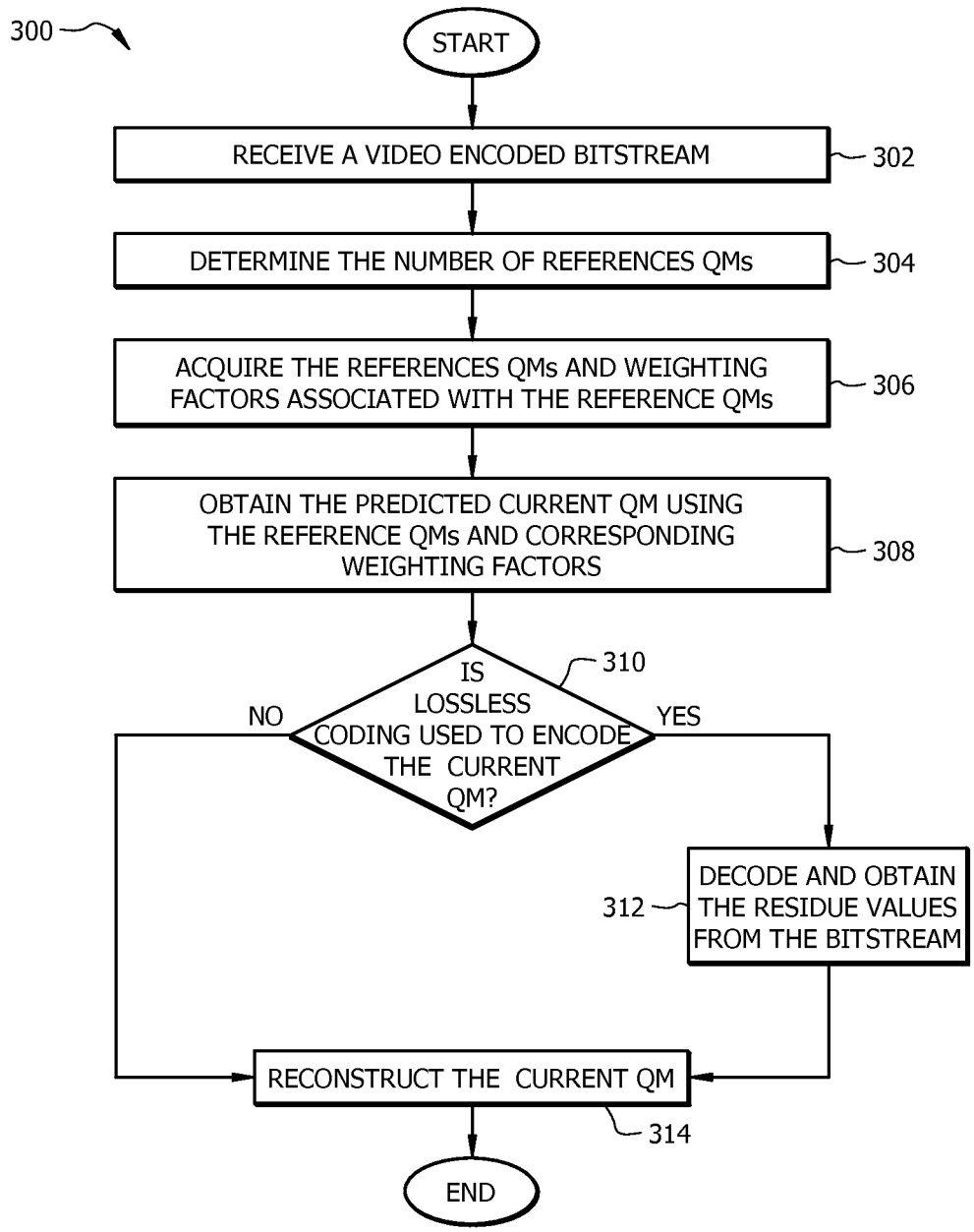
FIG. 3 is a flowchart of an embodiment of a method that decodes and reconstructs QMs using the encode prediction information from a video bitstream.

FIG. 3 is a flowchart of an embodiment of a method that decodes and reconstructs QMs using the encoded prediction information from a video bitstream. Similar to method 200, method 300 may support lossless and lossy coding, and cross-frame or inner QM prediction. Blocks 306 and 308 of method 300 may be substantially similar to blocks 202 and 204 of method 200 such that method 200 and method 300 may generate identical prediction QMs. Method 300 may reconstruct a compressed video data image by reconstructing QMs associated with the current picture using reference QMs.

Method 300 may start at block 302 and receives a video bitstream. The video bitstream may comprise prediction information, such as weighting factors and residue values used to reconstruct the QMs for a current picture. Method 300 may continue to block 304 and determine the number of reference QMs used to obtain the predicted QM for the current picture. The number of reference QMs used to predict the current QM may be predefined values for method 300. Using FIG. 1 as an example, the number of reference QMs (e.g. two reference QMs used to generate the predict QMs) may be hardcoded into the decoder unit 106. Another embodiment may equate the number of reference QMs to the number of weighted factors. For example, when two weighted factors are used to predict the current QM, the number of reference QMs may be about two. When the number of reference QMs are not found in a predefined value, method 300 may acquire the number of reference QMs from the video bitstream. Persons of ordinary skill in the art are aware that at least one reference QM may be used to obtain the predicted QM.

Method 300 may continue to blocks 306 and 308 which are substantially similar to blocks 202 and 204 of method 200. At block 308, method 300 determines whether the video bitstream was encoded using lossless coding. If method 300 determines whether the current QM is encoded with lossless coding, method 300 continues to block 312. At block 312, method 300 decodes and obtains the residue values from the video bitstream, and then progresses to block 314. Returning to block 310, when method 300 determines whether the current QM is encoded using lossy coding, method proceeds to block 314. At block 314, method 300 reconstructs the current QM using the residue value and the predicted QM, and subsequently ends, The reconstructed QM may then be used for inner or cross-frame prediction for decoding future pictures.

Figure 4:
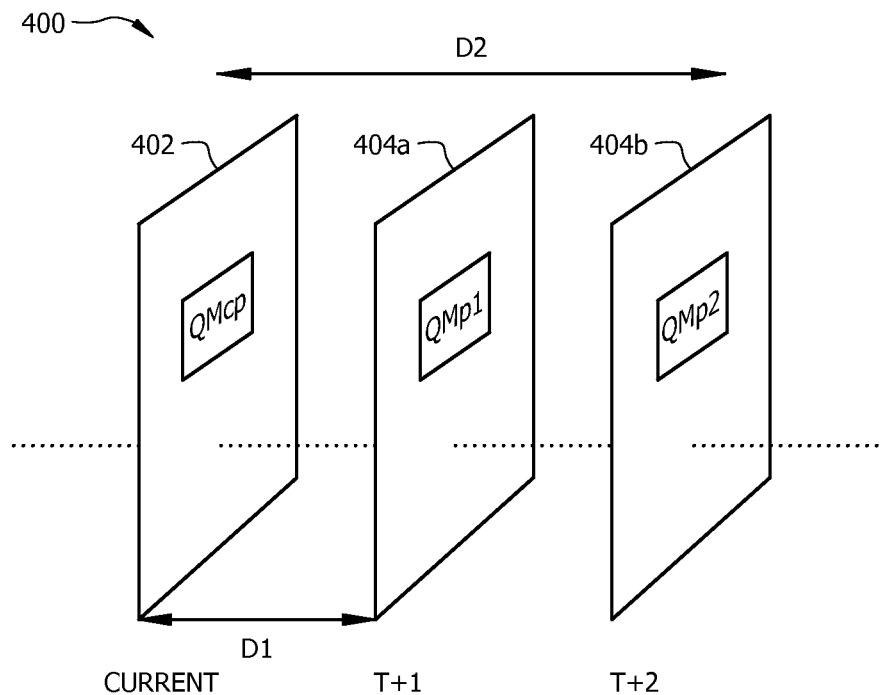
FIG. 4 is a schematic diagram of an embodiment of a video sequence used to determine weighting factors for a cross-frame QM weighting prediction.

FIG. 4 is a schematic diagram of an embodiment of a video sequence 400 used to determine weighting factors for a cross-frame QM weighting prediction. FIG. 4 illustrates a video sequence 400 that comprises a current picture 402 and two reference frames 404a and 404b (collectively referred to as reference frames 404), which may be located within different timeslots of the video sequence 400. The current picture 402 may represent the picture frame to be encoded or decoded. The reference frames 404a and 404b may be pictures already encoded or decoded using the methods as described in method 200 and method 300. Reference frame 404a may comprise a reference QM ($QMp_1$), while reference frame 404b may comprise a reference QM ($QMp_2$).

In FIG. 4, the two reference frames 404a and 404b are subsequent frames or frames temporally sequenced after the current picture 402, and thus, the QM prediction may be a forward prediction. As shown in FIG. 4, the reference frames 404 may be located at timeslots T+1 and T+2, respectively. Reference frame 404a may be positioned such that the reference frame 404a is sequentially located after the current picture 402, but before reference frame 404b. The time distance between the current picture 402 and the reference frame 404a (e.g. timeslot T+1) may be represented as distance $D_1$, while the time distance between the current picture 402 and the reference frame 404b (e.g. timeslot T+2) may be represented as distance $D_2$.

In FIG. 4, $QMp_1$ and $QMp_2$ may be used to predict the current QM (QMcp) of the current picture 402 according to the equation:

$$QMcp=\alpha_1 QMp_1+\alpha_2 QMp_2$$

In FIG. 4, the number of reference numbers may be about two. As discussed earlier, the reference number may have been a predefined value or encoded in the video bitstream. $\alpha_1$ and $\alpha_2$ may represent the weighting factors associated with QM references $QMp_1$ and $QMp_2$, respectively. Computation of the weighting factors may be implemented using linear weighting. For $QMp_1$, which is located at timeslot T+1, the distance $D_1$ may indicate a time distance between QMcp and $QMp_1$. The distance $D_2$ may indicate a time distance between QMcp and $QMp_2$, which is located at timeslot T+2. When time distance $D_1$ is about the value of one, and time distance $D_2$ is about the value of two, the weighted factors may be calculated by:

$$\alpha_1=D_2/(D_1+D_2) \alpha_2=D_1+D_2)$$

Hence, for cross-frame QM prediction, the weighting factor associated with a QM of a reference frame (e.g. $QMp_1$) may be computed linearly based on the time distance between the current picture 402 and the reference frame (e.g. reference frame 404a). QMs associated with reference frames 404 temporally farther away from the current picture 402 are weighted using a lower value weighting factor when compared to QMs associated with reference frames 404 temporally closer to the current picture 402.

Figure 5:
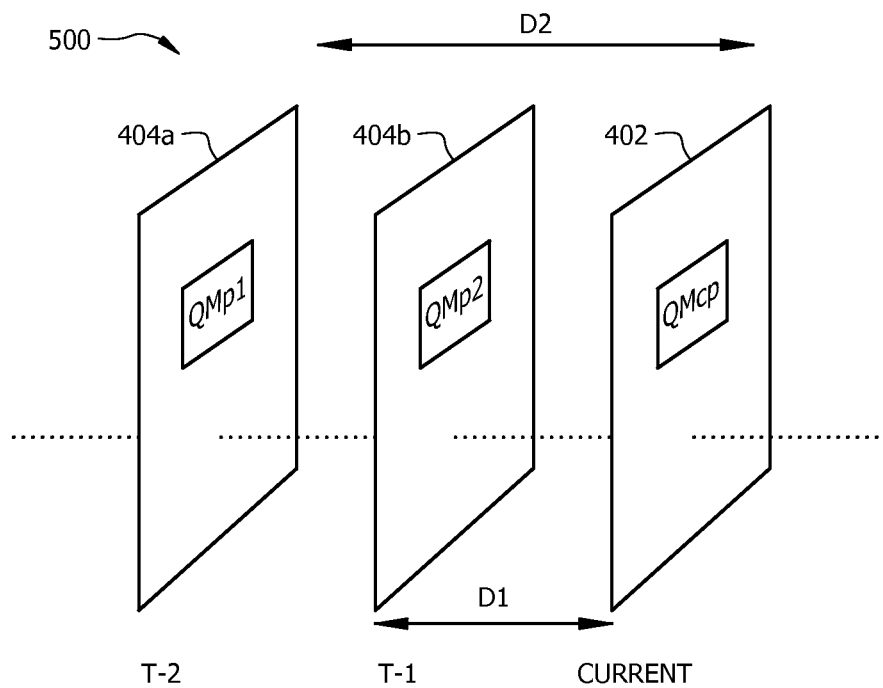
FIG. 5 is a schematic diagram of another embodiment of a video sequence used to determine weighting factors for a cross-frame QM weighting prediction.

FIG. 5 is a schematic diagram of another embodiment of a video sequence 500 used to determine weighting factors linearly for a cross-frame QM weighting backward prediction. The video sequence 500 is similar to the video sequence 400, as shown in FIG. 4, except that the reference frames 404a and 404b may temporally appear before the current picture 402, and thus the QM prediction may be in the forward direction. $QMp_1$, which is located in reference frame 404a, and $QMp_2$, which is located in reference frame 404b, may be used to predict QMcp located in the current picture 402 according to the same equation as described for FIG. 4:

$$QMcp=\alpha_1 QMp_1+\alpha_2 QMp_2$$

In FIG. 5, $QMp_1$ and reference frame 404a may be located at timeslot T−2, with a time distance between $QMp_1$ and QMcp of $D_2$. $QMp_2$ and reference frame 404b may be located at timeslot T−1, with a time distance between $QMp_2$ and QMcp of $D_1$. When the time distance $D_1$ is about the value of one, and the time distance $D_2$ is about the value of two, the weighted factors may be linearly calculated by:

$$\alpha_1=D_1/(D_1+D_2) \alpha_2=D_2/(D_1+D_2)$$

Similar to FIG. 4, reference QMs associated with reference frames 404 (e.g. reference frame 404a) that are temporally farther away from the current picture 402 are weighted using a lower value weighting factor when compared to reference QMs associated with reference frames 404 (e.g. reference frame 404b) that are temporally closer to the current picture 402.

Figure 6:
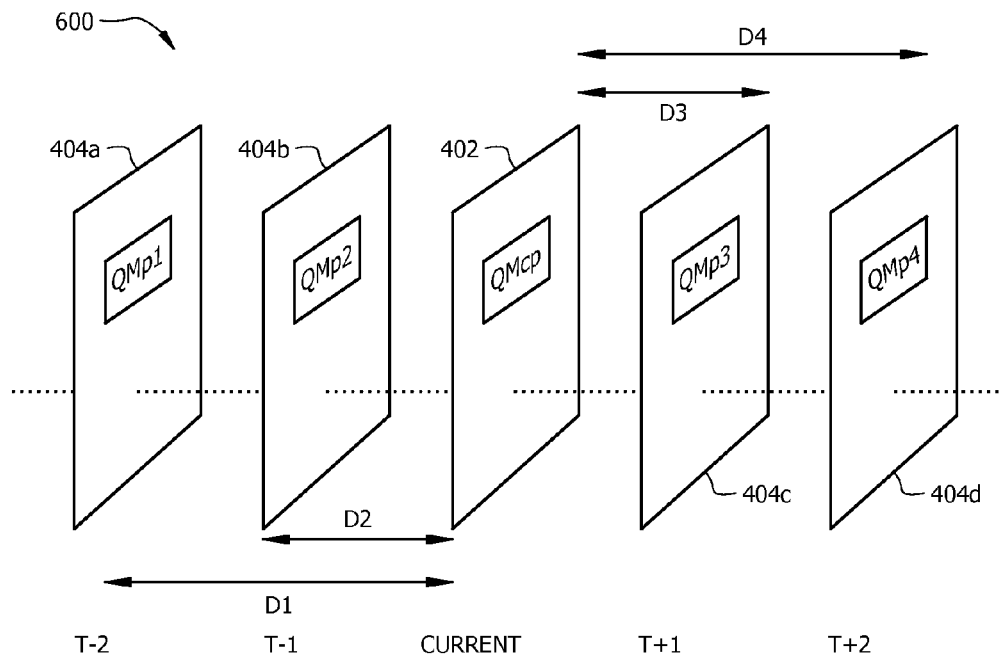
FIG. 6 is a schematic diagram of another embodiment of a video sequence used to determine weighting factors for a cross-frame QM weighting prediction.

FIG. 6 is a schematic diagram of another embodiment of a video sequence 600 used to determine weighting factors for a cross-frame QM weighting prediction. The video sequence 600 comprises a current picture 402 and four different reference frames 404a-d. FIG. 6 may be a bi-directional prediction of QMcp that is associated with the current picture 402. Reference frames 404a and 404b may be temporally located before the current picture 402 at timeslot values of T−2 and T−1 respectively. The remaining reference frames 404c and 404d may be temporally located after the current picture 402 at timeslot values of T+1 and T+2, respectively. Reference $QMp_1$, $QMp_2$, $QMp_3$, and $QMp_4$ of reference frames 404a-d, respectively, may be used to acquire the predicted QMcp. The predicted QMcp may be formulated as the following:

$$QMcp=\alpha_1 QMp_1+\alpha_1 QMp_2+\alpha_3 QMp_3+\alpha_4 QMp_4$$

As shown in FIG. 6, the number of references may be about four. The four different reference QMs may have varying time distance from the QMcp: $QMp_1$, which is located at timeslot T−2, may have a time distance $D_1$ with a value of about two; $QMp_2$, which is located at timeslot T−1, may have a time distance $D_2$ with a value of about one; $QMp_3$, which is located at timeslot T+1, may have a time distance $D_3$ with a value of about one; and $QMp_4$, which is located at timeslot T+2, may have a time distance $D_4$ with a value of about two. Therefore, the weighting factors may be calculated by:

$$\alpha_1=D_2/(D_1+D_2+D_3+D_4)\ \alpha_2 D_1/(D_1+D_2+D_3+D_4)$$

$$\alpha_3=D_4/(D_1+D_2+D_3+D_4)\ \alpha_4=D_3/(D_1+D_2+D_3+D_4)$$

Similar to FIGS. 4 and 5, the weighting factors for the bi-directional prediction of QMcp may also be determined by the frame distance between current frame and the reference frames. Reference QMs with far time distances (e.g. $QMp_1$) may be weighted using a lower value of weighing factor, while reference QMs in short time distances (e.g. $QMp_2$) may be weighted using a higher value of weighing factor.

Figure 7:
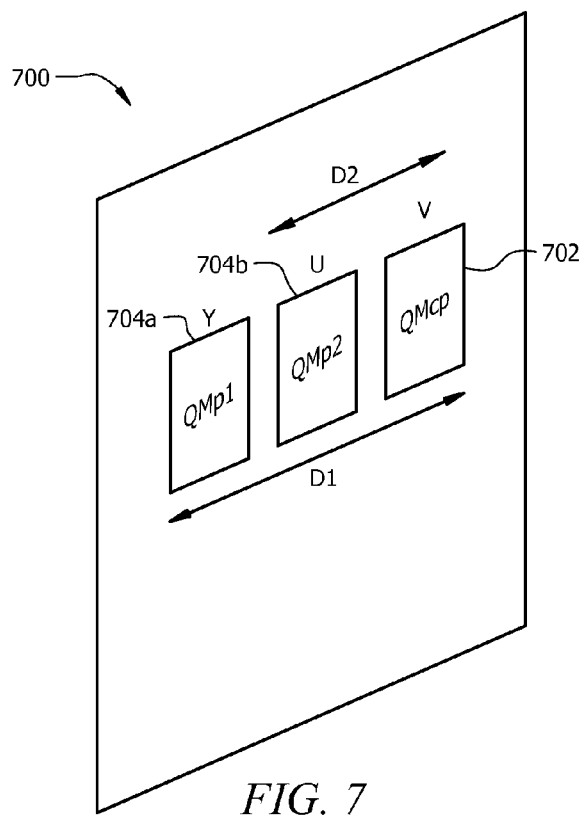
FIG. 7 is a schematic diagram of an embodiment of a current picture used to determine weighting factors for an inner QM weighting prediction.

FIG. 7 is a schematic diagram of an embodiment of a current picture 700 used to determine weighting factors for an inner QM weighting prediction. Two inner reference QMs 704a and 704b, which may be collectively referred to as QMs 704, may be selected from the set of inner QMs from a current picture 700 to predict the current QM 702 (e.g. QMcp). The two inner reference QMs 704a (e.g. $QMp_1$) and 704b (e.g. $QMp_2$) may have already been encoded or decoded as described in method 200 or method 300, respectively. As shown in FIG. 7, the predicted QM 702 may be used to indicate a V component, while the reference QMs 704a and 704b may indicate a Y component and a U component, respectively. The V and U components may represent chroma components, while the Y component or luma may indicate the brightness for the picture. Similar to predicting QMs using cross-frame QM prediction, the predicted QM 702 for an inner QM prediction may be formulated as the following:

$$QMcp = \alpha_1 QMp_1 + \alpha_2 QMp_2$$

As stated earlier, the reference number may be about two for the formula used to predict the current QM 702.

The weighting factors may be computed based on the component distance between the predicted QM 702 and a reference QM 704. The component distance may be based on the types of components associated with predicted QM 702 and the reference QM 704. QMs that are associated with similar components may have smaller component distances, while QMs that are associated with different components may have larger component distances. In FIG. 7, the predicted QM 702 may be associated with the V component, and the reference QM 704b (e.g. $QMp_2$) may be associated with the U component. Component distance $D_2$ represents the distance between the predicted QM 702 and reference QM 704b, which may be relatively small because both, U and V components, are color or aroma components.

Component distance $D_1$ represents the distance between the predicted QM 702 and the reference QM 704a (e.g. $QMp_1$). However, because reference QM 704a may be associated with a different component (e.g. a Y or luma component), component distance $D_1$ may be relatively larger than $D_2$. When the component distance $D_1$ is about a value of two and the component distance $D_2$ is about a value of one, the weighting factors may be calculated by:

$$\alpha_1 = D_2/(D_1+D_2) \quad \alpha_2 = D_1/(D_1+D_2)$$

Similar to cross-frame QM prediction, reference QMs 704 that have a farther distance (e.g. component distance) from the predicted QM 702 may have a lower weighting value than reference QMs 704 that are closer to the predicted QM 702.

Reference QMs 704 associated with the same type of component may be equally or averagely weighted. In FIG. 7, the reference QMs may have the same component distance, be equally spaced, or an average distance may be computed from the predicted QM 702 when the reference QMs are associated with the same type of component. For example, if reference QM 704a was associated with a U component instead of a Y component, both component distances $D_1$ and $D_2$ may have values equal to each other. As a result, the weighting factors for reference QM 704a (e.g. $QMp_1$) and QM 704b (e.g. $QMp_2$) may also be equal. In another embodiment, the component distances between the predicted QM 702 and reference QMs 704 associated with the same type component may be different.

Figure 8:
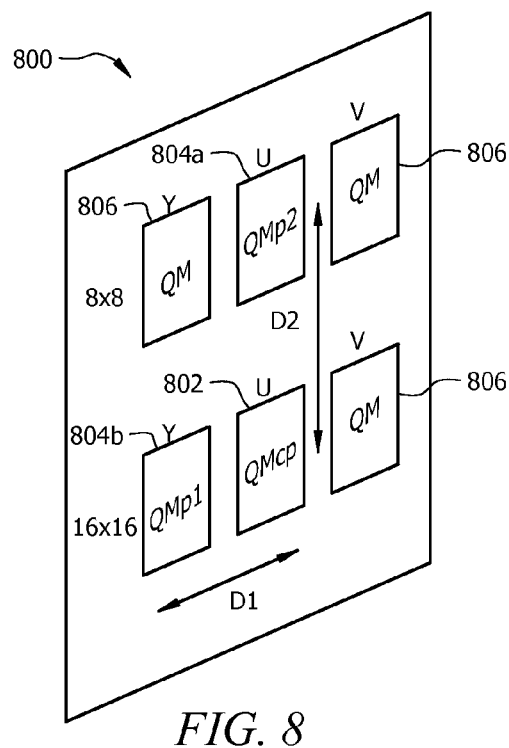
FIG. 8 is a schematic diagram of another embodiment a current picture used to weighting factors for an inner QM weighting prediction.

FIG. 8 is a schematic diagram of an embodiment of a current picture 800 used to determine weighting factors for an inner QM weighting prediction. In FIG. 8, the predicted QM 802 (e.g. QMcp) may be associated with a U component with a 16×16 block size. Reference QM 804a ($QMp_2$) may also be associated with a U component, but with an 8×8 block size. The other reference QM 804b ($QMp_1$) may be associated with a Y component and a block size of 16×16. QMs 806 may be other QMs with the current picture 800 not selected as reference QMs 804a and 804b for the current predicted QM 802. QMs 806 may be QMs that have already been encoded or decoded, or may be QMs waiting to be encoded or decoded.

The distances $D_1$ and $D_2$ may represent distances based on block size. Distances $D_1$ may indicate the distance between reference QM 804b and the predicted QM 802, while distance $D_2$ may indicate the distance between reference QM 804a and the predicted QM 802. Distances $D_1$ and $D_2$ may indicate distances based on the block size of the reference QMs 804. Reference QMs 804 that have block sizes that are the same block size to the predicted QM 802 may have smaller distances than QMs with different block sizes. For example, in FIG. 1, reference QM 804b has a block size (e.g. 16×16) that matches the predicted QM block size (e.g. 16×16). Reference QM 804a may have a block size (e.g. 8×8) that is smaller than the predicted QM 802 block size. Hence, the distance between reference QM 804b and the predicted QM 802 may be smaller than reference QM 804a.

Similar to predicting QMs using inner QM prediction as described for FIG. 7, the predicted QM 802 may be formulated as the following:

$$QMcp = \alpha_1 QMp_1 + \alpha_2 QMp_2$$

When the component distance $D_1$ is about a value of one and the component distance $D_2$ is about a value of two, the weighting factors may be calculated by:

$$\alpha_1 = D_2/(D_1+D_2) \quad \alpha_2 = D_1/(D_1+D_2)$$

Similar to FIG. 7, reference QMs 804 that have a farther distance from the predicted QM 802 may have a lower weighting value than reference QMs 804 that are closer to the predicted QM 802. Additionally, equally and average weighting, as described above, may be applied when the reference QMs 804 have the same block size.

Figure 9:
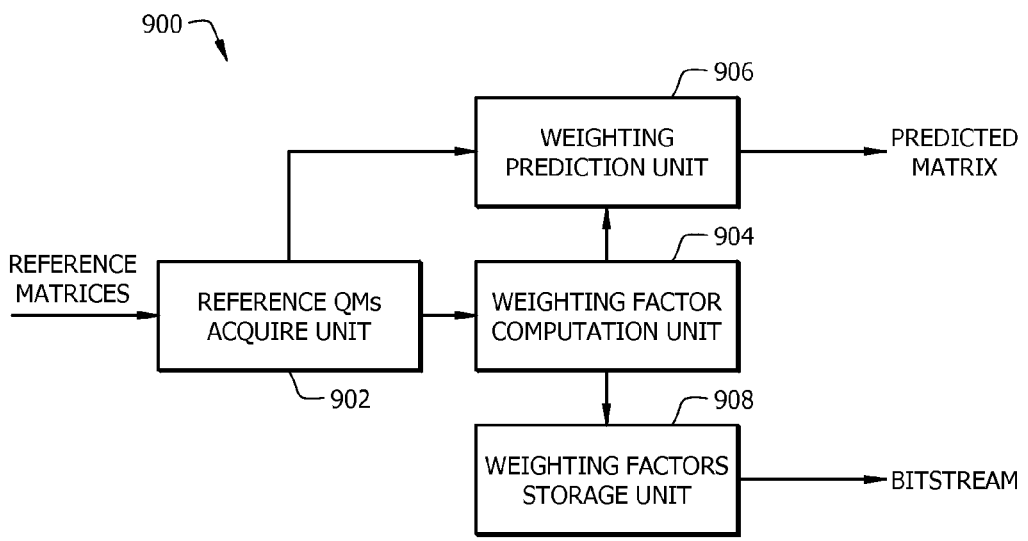
FIG. 9 is a schematic diagram of an embodiment of an encoder unit that comprises a QM prediction unit.

FIG. 9 is a schematic diagram of an embodiment of an encoder unit that comprises a QM prediction unit 900. The encoder unit may initially receive a source video that comprises a sequence of video pictures. To compress and encode the source video, the encoder unit may comprise the QM prediction unit 900 to generate prediction QMs. The encoder unit may further comprise other components that are not shown, such as a rate-distortion optimization unit, a transform unit, a quantization unit, and filters used to encode the source video into a video bitstream. The QM prediction unit 900 may comprise a reference QMs acquire unit 902, a weighting factor computation unit 904, a weighting prediction unit 906, and a weighting factors storage unit 908. As shown in FIG. 9, the reference QMs acquire unit 902 may be coupled to the weighting factor computation unit 904 and the weighting prediction unit 906. In addition to being coupled to the reference QMs acquire unit 902, the weighting factor computation unit 904 may be coupled to the weighting prediction unit 906 and weighting factors storage unit 908.

The reference QMs acquire unit 902 may acquire reference QMs from reference frames (e.g. cross-frame QM prediction) or from the current picture currently being encoded by the encoder unit. In one embodiment, the reference QMs may originate from an encoded picture buffer configured to store encoded pictures used for the prediction of subsequent pictures. After acquiring the reference QMs, the reference QMs may be transmitted to the weighting prediction unit 906 and the weighting factor computation unit 904. The weighting factor computation unit 904 may subsequently compute the weighting factors as described in FIGS. 4-8 for each of the reference QMs. The weighting factor computation unit 904 then transmits the weighting factors to the weighting prediction unit 906 and the weighting factor storage unit 908. The weighting factors storage unit 908 may be configured to encode the weighting factors into the video bitstream using entropy coding. In one embodiment, the weighting factors storage unit 908 may also encode the number of reference QMs into the video bitstream when the number of reference QMs is not predefined or coded in the encoder unit.

The weighting prediction unit 906 may be configured to receive the reference QMs and the weighting factors from the reference QMs acquire unit 902 and the weighting factor computation unit 904, respectively. The weighting prediction unit 906 may then generate the predicted QM using the weighted factors and the reference QMs as described above in FIGS. 4-8. The number of reference QMs used to generate the predicted QM may be a predefined value coded into the encoder unit. In another embodiment, the number of reference QMs used to generate the predicted QM may be equal to the number weighted factors received from the weighting factor computation unit 904. The predicted QM may then be used by the encoder unit to complete encoding of the source video.

Figure 10:
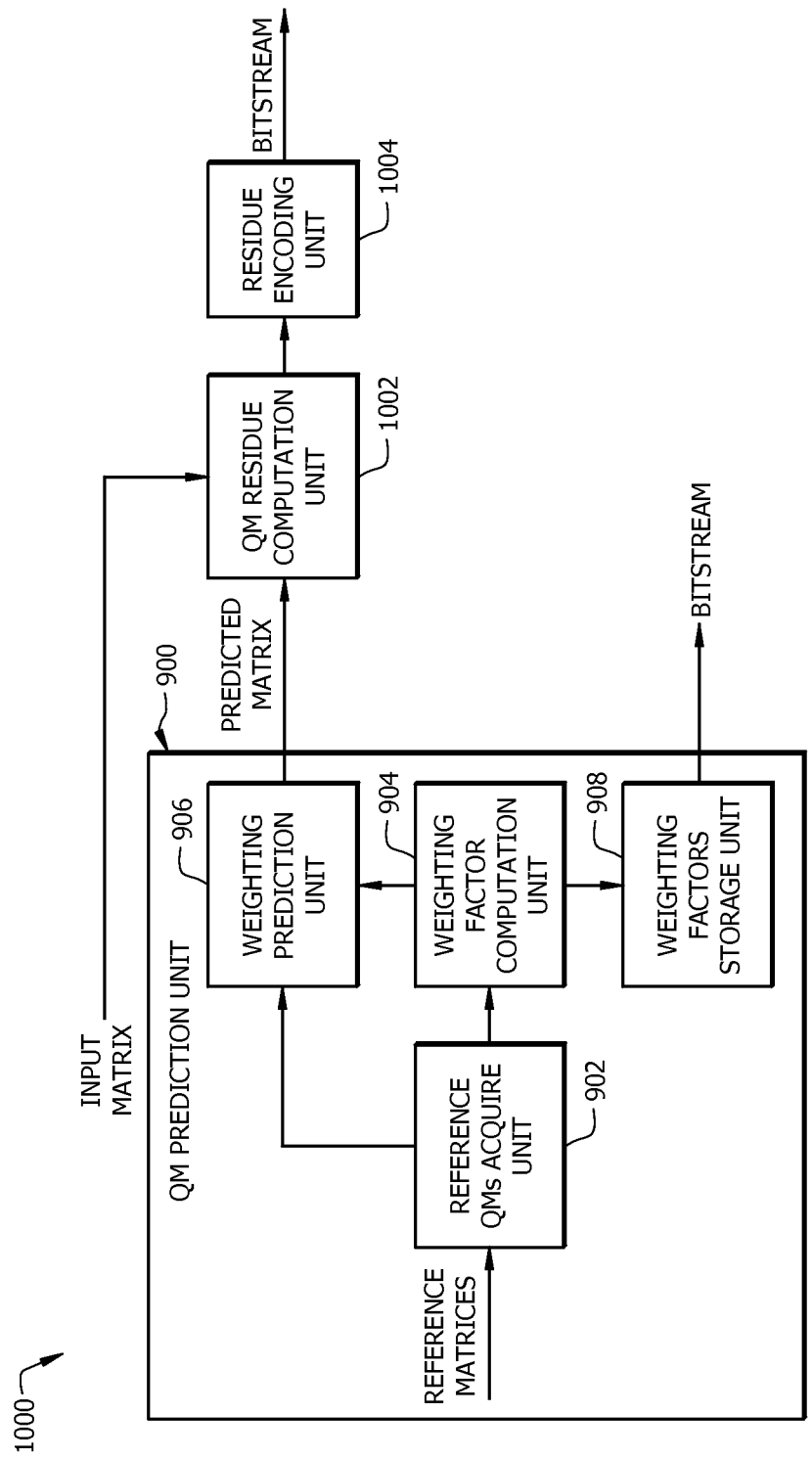
FIG. 10 is a schematic diagram of another embodiment of an encoder unit that comprises a QM prediction unit.

FIG. 10 is a schematic diagram of another embodiment of an encoder unit 1000 that comprises a QM prediction unit 900. The encoder unit 1000 is substantially similar to the encoder unit in FIG. 9, except that the encoder unit 1000 may further comprise a QM residue computation unit 1002 and a residue encoding unit 1004 for lossless encoding. The QM residue computation unit 1002 may be coupled between the weighting prediction unit 906 and residue encoding unit 1004. The QM residue computation unit 1002 may be configured to compute the residue of the predicted QM and the input matrix. The input matrix may be the current QM associated with the current picture currently being encoded by the encoder unit 1000. The residue computation unit 1002 may generate the residue values by subtracting the current QM with the predicted QM or vice versa. The residue values may then transmit to the residue encoding unit 1004 to compress and encode the residue values into the video bitstream. Persons of ordinary skill in art are aware of a variety of ways to encode the residue values, such as using entropy coding.

Figure 11:
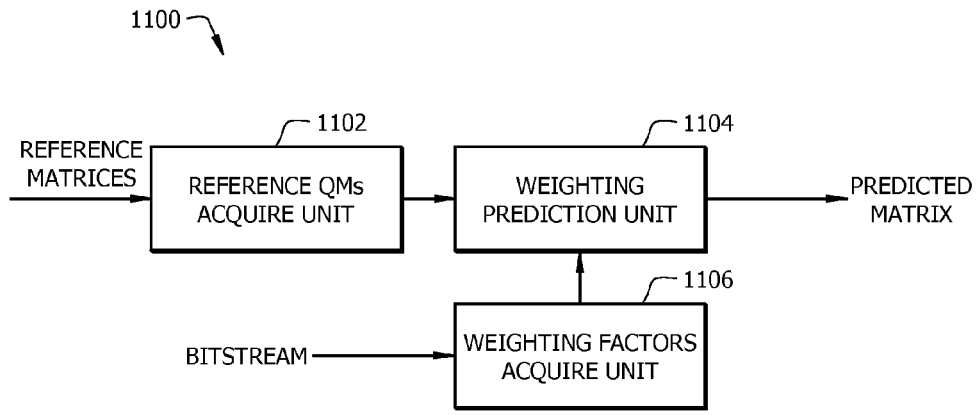
FIG. 11 is a schematic diagram of an embodiment of a decoder unit that comprises a QM prediction unit.

FIG. 11 is a schematic diagram of an embodiment of a decoder unit that comprises a QM prediction unit 1100. The decoder unit may initially receive a video bitstream from an encoder unit as described in FIGS. 9 and 10. To decode the video bitstream to reconstruct the source video, the decoder unit may comprise the QM prediction unit 1100 to generate prediction QMs used to encode the source video. The decoder unit may further comprise other components that are not shown, such as an entropy decoder unit, a de-quantization unit, and an inverse transform unit used to decode and reconstruct the source video from information encoded in the video bitstream. The QM prediction unit 900 may comprise a reference QMs acquire unit 1102, a weighting prediction unit 1104, and a weighting factors acquire unit 1106. FIG. 11 illustrates that the weighting prediction unit 1104 may be coupled between the reference QMs acquire unit 1102 and weighting factor acquire unit 1106.

The reference QMs acquire unit 1102 may be substantially similar to the reference QMs acquire unit 902 as described in FIG. 9. In contrast to the reference QMs acquire unit 902, the reference QMs acquire unit 1102 uses QMs that have already been decoded by the decoder unit as reference QMs. After obtaining the reference QMs, the reference QMs acquire unit 1102 may forward the reference QMs to the weighting prediction unit 1104. The weighting factors acquire unit 1106 may be configured to extract the weighting factors encoded in the video bitstream. Decoding the video bitstream may be implemented using method and units well-known in the art, such as entropy decoding. Additionally, the weighting factors acquire unit 1106 may determine the number of reference QM from the video bitstream that corresponds to predicting the current QM if the value is not predefined in the decoder unit. In one embodiment, the number of reference may be equal to the number of weighting factors. The weighting factors acquire unit 1106 may then forward the weighted factors and the number of references to the weighting prediction unit 1104.

After the weighting prediction unit 1104 receives the weighting factors from the weighting factors acquire unit 1106 and the reference QMs from the reference QMs acquire unit 1102, the weighting prediction unit 1104 may generate the predicted QM being decoded by the decoder unit. Generation of the predicted QM may be substantially similar to the generation of the predicted QM as described in FIGS. 4-8. For a cross-frame QM prediction, the QM prediction direction, which refers to the temporal location of reference frames within the source video (e.g. timeslots T−1 and T−2), may be extracted from the video bitstream. For example, if the reference frames are temporally located before the current picture, the QM prediction direction may be in the forward direction. If the reference frames are temporally located after the current picture, the QM prediction may be in the reverse direction. When reference frames are temporally located before and after the current picture, the QM prediction may be bi-directional. The predicted QM may subsequently be used to reconstruct the current QM associated with the current picture.

Figure 12:
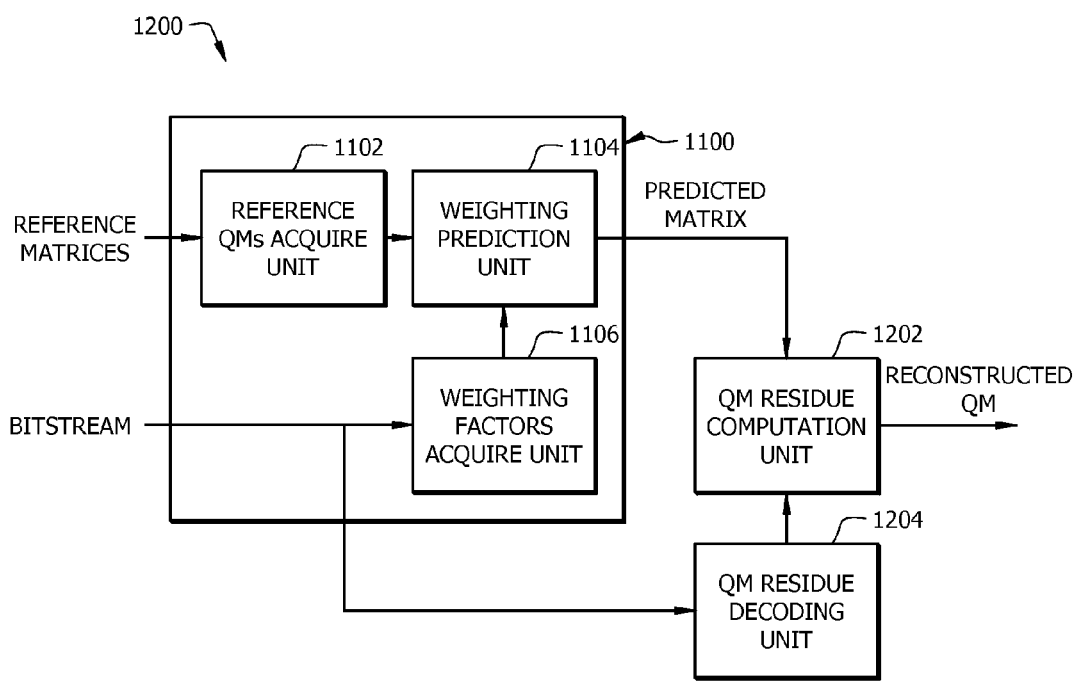
FIG. 12 is a schematic diagram of another embodiment of a decoder unit that comprises a QM prediction unit.

FIG. 12 is a schematic diagram of another embodiment of a decoder unit 1200 that comprises a QM prediction unit 1100. The decoder unit 1200 is substantially similar to the decoder unit in FIG. 11, except that the decoder unit 1200 may further comprise a QM residue computation unit 1202 and a QM residue decoding unit 1204 for lossless decoding. The QM residue computation unit 1202 may be coupled between the weighting prediction unit 1104 and the QM residue decoding unit 1204. The QM residue decoding unit 1204 may acquire residue values from the video bitstream. The QM residue decoding unit 1204 may decode the video bitstream as described for the weighting factors acquire unit 1106. After acquiring the residue values, the decoding unit 1204 may forward the residue values to the QM residue computation unit 1202. The QM residue computation unit 1202 may also receive the predicted QM from the weighting prediction unit 1104. The QM residue computation unit 1202 may reconstruct the QM by adding the residue values to the predicted QM.

Figure 13:
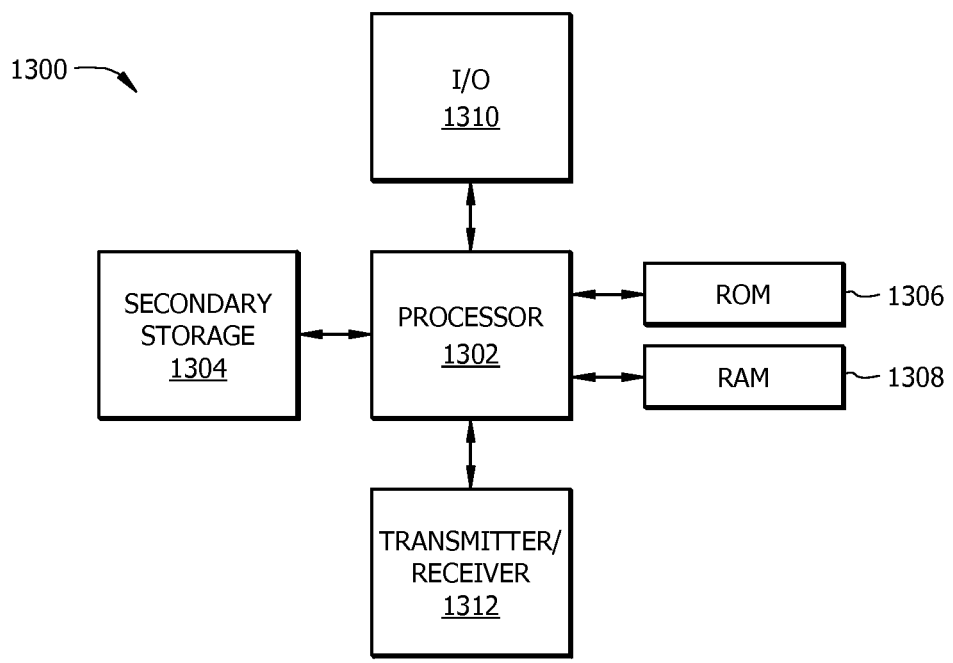
FIG. 13 is a schematic diagram of one embodiment of a general-purpose computer system suitable for implementing the several embodiments of the disclosure.

The schemes described above may be implemented on any general-purpose computer system, such as a computer or network component with sufficient processing power, memory resources, and network throughput capability to handle the necessary workload placed upon it. FIG. 13 illustrates a schematic diagram of a general-purpose computer system 1300 suitable for implementing one or more embodiments of the methods disclosed herein, such as the QM prediction unit 900, the encoder unit 1000, and the decoder unit 1200. The computer system 1300 includes a processor 1302 (which may be referred to as a central processor unit or CPU) that is in communication with memory devices including secondary storage 1304, read only memory (ROM) 1306, random access memory (RAM) 1308, transmitter/receiver 1312, and input/output (PO) device 1310. Although illustrated as a single processor, the processor 1302 is not so limited and may comprise multiple processors. The processor 1302 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1302 may be configured to implement any of the schemes described herein, such as the method 200, method 300, the QM prediction unit 900, the encoder unit 1000, and the decoder unit 1200. The processor 1302 may be implemented using hardware, software, or both.

The secondary storage 1304 is typically comprised of one or more disk drives or tape drives and is used for non-volatile storage of data and as an over-flow data storage device if the RAM 1308 is not large enough to hold all working data. The secondary storage 1304 may be used to store programs that are loaded into the RAM 1308 when such programs are selected for execution. The ROM 1306 is used to store instructions and perhaps data that are read during program execution. The ROM 1306 is a non-volatile memory device that typically has a small memory capacity relative to the larger memory capacity of the secondary storage 1304. The RAM 1308 is used to store volatile data and perhaps to store instructions. Access to both the ROM 1306 and the RAM 1308 is typically faster than to the secondary storage 1304. The secondary storage 1304, ROM 1306, and/or RAM 1308 may be non-transitory computer readable mediums and may not include transitory, propagating signals. Any one of the secondary storage 1304, ROM 1306, or RAM 1308 may be referred to as a memory, or these modules may be collectively referred to as a memory. Any of the secondary storage 1304, ROM 1306, or RAM 1308 may be used to store weighting factors as described herein, The processor 1302 may generate the weighting factors and store the weighting factors in memory and/or retrieve the weighting factors from memory.

The transmitter/receiver 1312 may serve as an output and/or input device of the encoder unit 1000, and the decoder unit 1200. For example, if the transmitter/receiver 1312 is acting as a transmitter, it may transmit data out of the computer system 1300. If the transmitter/receiver 1312 is acting as a receiver, it may receive data into the computer system 1300. The transmitter/receiver 1312 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 1312 may enable the processor 1302 to communicate with an Internet or one or more intranets. I/O devices 1310 may include a video monitor, liquid crystal display (LCD), touch screen display, or other type of video display for displaying video, and may also include a video recording device for capturing video. I/O devices 1310 may also include one or more keyboards, mice, or track balls, or other well-known input devices.

It is understood that by programming and/or loading executable instructions onto the computer system. 1300, at least one of the processor 1302, the RAM 1308, and the ROM 1306 are changed, transforming the computer system 1300 in part into a particular machine or apparatus, e.g., a video codec, having the novel functionality taught by the present disclosure. It is fundamental to the electrical engineering and software engineering arts that functionality that can be implemented by loading executable software into a computer, which can he converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may he preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for encoding a quantization matrix (QM) associated with a picture, comprising:
   a memory;
   a processor operably coupled to the memory and configured to:
   acquire a plurality of reference QMs, wherein the reference QMs have previously been encoded;
   compute a weighting factor based on a distance between the reference QMs and a predicted QM from immediately adjacent frames in either a forward direction or in a backward direction, but not both, relative to time;
   compute the predicted QM using the reference QMs and the corresponding weighting factors; and
   store the weighting factors into a video bitstream,
   wherein the video bitstream is transmitted to a decoder.

2. The apparatus of claim 1, wherein the processor is further configured to decode a plurality of QM residue values from the video bitstream and reconstruct the QM using the QM residue values and the predicted matrix.

3. The apparatus of claim 1, wherein the weighting factor is computed using at least one of a plurality of weighting methods: a linear weighting, an equally weighting, and an average weighting.

4. The apparatus of claim 1, wherein the number of reference QMs used to compute the predicted matrix is determined by the number of weighting factors.

5. The apparatus of claim 1, wherein the apparatus further comprises a QM residues computation unit, and wherein the QM residues computation unit is configured to receive the QM from the picture and compute a plurality of residue values by comparing the predicted QM with the QM.

6. The apparatus of claim 1, wherein the reference QMs are associated with a plurality of pictures frames that are not the same as the picture, and wherein the weighting factors associated with reference QMs that are associated with the pictures farther away from the picture have lower weighting values when compared to the weighting factors of reference QMs that are associated with pictures closer to the picture.

7. The apparatus of claim 1, wherein the reference QMs are associated with the picture, and wherein the weighting factors associated with the reference QMs that match a matrix size of the QM have less weight than the weighting factors associated the reference QMs that have different matrix sizes when compared to the matrix size of the QM.

8. The apparatus of claim 1, wherein the weighting factors are computed using at least one of a plurality of weighting methods: a linear weighting, an equally weighting, and an average weighting.

9. A method for encoding a quantization matrix (QM) associated with a picture, wherein the method comprises:
   acquiring a first QM reference and a second QM reference;
   acquiring a first weighting factor that corresponds to the first QM reference and a second weighting factor that corresponds to the second QM reference;
   obtaining a predicted QM using the first QM reference, the second QM reference, the first weighting factor, and the second weighting factor; and
   encoding the first weighting factor and the second weighting factor into a video bitstream, wherein the video bitstream is transmitted to a decoder,
   wherein the first weighting factor and the second weighting factor are each based on a distance between the first and second QM references and the predicted QM from immediately adjacent frames in either a forward direction or in a backward direction, but not both, relative to time.

10. The method of claim 9, wherein the method further comprises:
    determining whether to encode the QM using lossless coding;
    compute a plurality of residue values by comparing the predicted QM with the QM that is about to be encoded; and
    encode the residues values into the video bitstream.

11. The method of claim 9, wherein the method further comprises encoding a reference number that indicates the number of reference values used to generate the predicted QM into the video bitstream.

12. The method of claim 9, wherein the method further comprises encoding a prediction direction into the video bitstream, and wherein the prediction direction indicates the temporal location of the first QM reference and the second QM reference relative to the picture.

13. An apparatus for encoding a quantization matrix (QM) associated with a picture, comprising:
    a memory;
    a processor operably coupled to the memory and configured to:
    acquire a plurality of reference QMs, wherein the reference QMs have previously been encoded;

compute a weighting factor based on a distance between the reference QMs and a predicted QM in either a forward direction or in a backward direction, but not both, relative to time;

compute the predicted QM using the reference QMs and the corresponding weighting factors;

store the weighting factors into a video bitstream; and a transmitter operably coupled to the processor and configured to transmit the video bitstream to a decoder, wherein the reference s are associated with the picture, and wherein the weighting factors associated with the reference QMs that match a matrix size of the QM have less weight than the weighting factors associated with the reference QMs that have different matrix sizes when compared to the matrix size of the QM.

* * * * *

UNITED STATES PATENT AND TRADEMARK OFFICE
CERTIFICATE OF CORRECTION

PATENT NO. : 9,762,902 B2
APPLICATION NO. : 13/737863
DATED : September 12, 2017
INVENTOR(S) : Jianhua Zheng et al.

Page 1 of 1

It is certified that error appears in the above-identified patent and that said Letters Patent is hereby corrected as shown below:

In the Claims

Column 16, Lines 61-67, through Column 17, Lines 1-16, Claim 13 should read:
13. An apparatus for encoding a quantization matrix (QM) associated with a picture, comprising:
    a memory;
    a processor operably coupled to the memory and configured to:
    acquire a plurality of reference QMs, wherein the reference QMs have previously been encoded;
    compute a weighting factor based on a distance between the reference QMs and a predicted QM in either a forward direction or in a backward direction, but not both, relative to time;
    compute the predicted QM using the reference QMs and the corresponding weighting factors;
    store the weighting factors into a video bitstream; and
    a transmitter operably coupled to the processor and configured to transmit the video bitstream to a decoder,
    wherein the reference QMs are associated with the picture, and
    wherein the weighting factors associated with the reference QMs that match a matrix size of the QM have less weight than the weighting factors associated with the reference QMs that have different matrix sizes when compared to the matrix size of the QM.

Signed and Sealed this
Seventh Day of November, 2017

Joseph Matal
*Performing the Functions and Duties of the
Under Secretary of Commerce for Intellectual Property and
Director of the United States Patent and Trademark Office*